June 23, 1931.  F. C. KAINER  1,811,200
SPLIT SCREW COUPLING
Filed Nov. 2, 1928
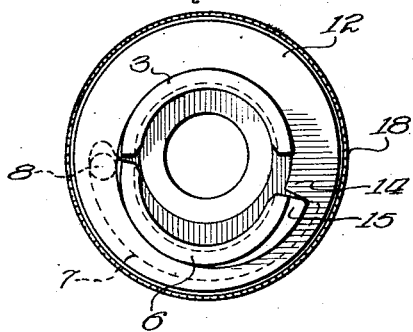
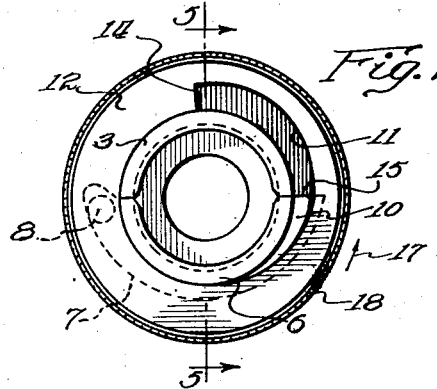
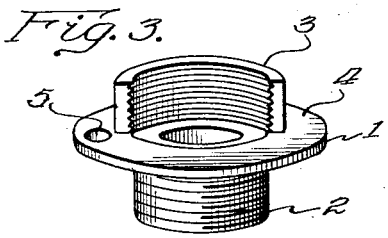
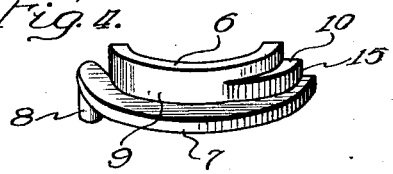
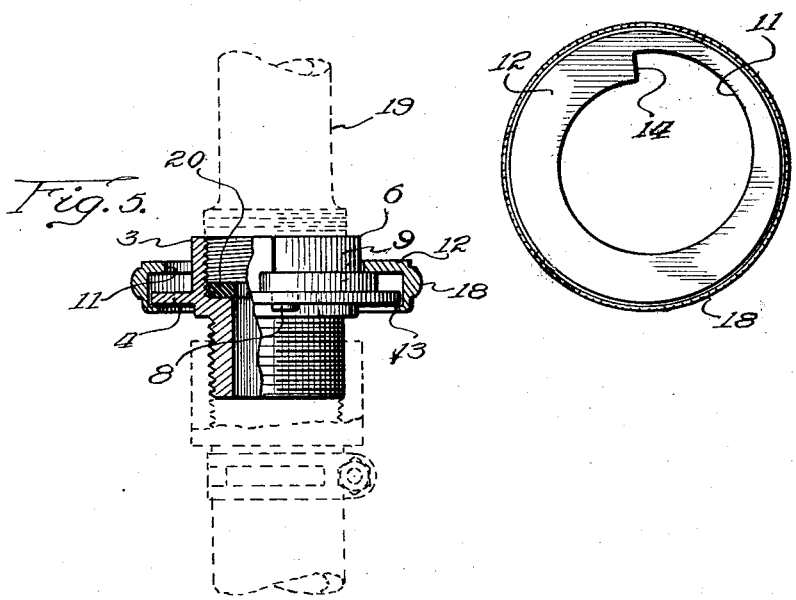
Witnesses.
Arthur M. Framke.
Oliver F. Feth
Inventor:
Frederick C. Kainer,
By Rummler & Rummler
Attys.

Patented June 23, 1931

1,811,200

UNITED STATES PATENT OFFICE

FREDERICK C. KAINER, OF PARK RIDGE, ILLINOIS

SPLIT SCREW COUPLING

Application filed November 2, 1928. Serial No. 316,675.

This invention relates to coupling devices designed for attachment to threaded elements, and the principal purpose of the invention is to provide improvements which will enable rapid coupling by avoiding the necessity of screwing one threaded member onto another and permit the connection to be made by clamping the two together with the threads properly engaged.

Other objects of the invention are, to provide locking means for locking two threaded elements together tighter than normal; to avoid the ordinary difficulty in starting threads to engage and to provide a construction of this class which is workable, even though the end of the thread of one member is so mutilated that ordinarily the connection could not be made.

These objects are accomplished by a construction such as shown in the drawings, in which—

Figure 1 is a plan view showing the coupling in open, disengaged, position.

Fig. 2 is a plan view showing the coupling as it would appear when in closed, gripping position.

Fig. 3 is a perspective view of the body portion of the coupling.

Fig. 4 is a perspective view of a movable jaw element of the coupling.

Fig. 5 shows the coupling in elevation and partly in section. This view also shows in dotted lines a pair of conduits which are connected by the coupling.

Fig. 6 is a plan view of a cam for operating the movable jaw element of the coupling.

The device as shown in the drawings is particularly designed for use as a hose coupling, or for connecting a garden hose to a faucet, although it is susceptible of many other uses.

The construction consists essentially of a supporting element which may include integral therewith a fixed jaw element or nut sector, having an internal thread, and a co-operating movable jaw element or nut sector, also having an internal thread and pivotally supported so as to be movable toward and away from the fixed jaw element, and thereby serve to grip an externally threaded element over which the coupling is placed.

For the purpose of operating the movable jaw element to cause it to move toward or away from the fixed jaw element, an annular cam is provided which surrounds the jaw elements and coacts with the movable one to positively cam it into and out of clamping position.

There are therefore three essential elements to the construction. Of these members as shown in the drawings, a supporting element 1 may be provided with a suitable fitting such as a hollow threaded nipple 2, for connection with a hose or pipe, or may be otherwise arranged to be inserted in and clamped to the end of a hose.

Integral with the body part 1 is an internally threaded half nut 3, and the disk or flange portion 4 of the member 1 is drilled out at 5 to provide a pivotal support for a movable jaw member or half nut 6.

The movable nut sector 6 is internally threaded, and is provided with a flange 7 which carries an integral pivot pin 8 for fitting within the aperture 5. The bottom of the flange 7 of the member 6 therefore rests upon the flange 4 of member 1. The exterior curved surface 9 of the member 6 together with the curved outer surface of the shoulder 10 projecting therefrom, coact with the internal spiral edge 11 of the ring 12. The ring 12, as shown in plan in Fig. 6, has a top flange with an internal edge of snail or involute like form, so shaped as to encircle the jaws 3 and 6 and close them when the ring is turned counter-clockwise as viewed in Fig. 1. The flange of ring 12 also extends over the flange 7 of jaw element 6, and retains this jaw against longitudinal displacement.

The ring 12 is also provided with an inwardly extending flange 13 rolled over the flange 4 of element 1, and is therefore retained against axial displacement with respect to the remaining elements of the coupling.

The upper flange or ring 12 has a shoulder 14 thereon for coacting with the end or shoulder 15 of the movable jaw element 6, whereby when the cam is rotated in the direction indicated by the arrow 17, from the position in which it is indicated in Fig. 2 to the position in which it is indicated in Fig. 1, the shoulder 14 engages the end of the jaw 6, moving the latter from the closed position in Fig. 2 to the open position shown in Fig. 1. The exterior surface of the cam member 12 is knurled at 18 to provide a suitable grip for operation thereof. A reverse movement of the cam 12, approximately a quarter of a turn thereof, serves to cam the jaw 6 into clamping position, due to the camming action of surface 11 thereof against the curved exterior surface 9 and shoulder 10 of the jaw 6.

In the operation of the construction illustrated, it may be applied for example to the threaded end of a faucet 19, Fig. 5, by sliding it over the faucet when in the open position as illustrated in Fig. 1, then by a slight rotary movement in a counter-clockwise direction, Fig. 1, of the cam 12, the device is coupled to the faucet. Continued rotation in the same direction turns the whole coupling on the screw thread of the faucet, causing the end of the faucet to bear against gasket 20. In similar fashion it may be connected to the male part of an ordinary hose coupling.

Although but one specific embodiment of this invention has been herein shown and described, it will be understood that details of the construction shown may be altered or omitted without departing from the spirit of this invention as defined by the following claims:

I claim:

1. A split screw coupling comprising a supporting structure having an internally threaded arcuate flange sector projecting from one surface thereof, the outer surface of said flange sector being concentric with said support, an internally threaded member pivotally mounted upon said support and formed to provide a continuation of said flange, shoulder on the outer surface of said member, the outer edge of said shouder being eccentrically curved with reference to the curvature of said member, a ring surrounding said flange and member, the inner surface of said ring having one portion formed according to the eccentricity of the shoulder on said pivot member, and the remaining portion of said surface having the same curvature as the outer surface of said flange.

2. A split screw coupling comprising a supporting structure having an internally threaded arcuate flange sector projecting from one surface thereof, the outer surface of said flange sector being concentric with said support, an internally threaded member pivotally mounted upon said support and formed to provide a continuation of said flange, a shoulder on the outer surface of said member, the outer edge of said shoulder being eccentrically curved with reference to the curvature of said member, a ring surrounding said flange and member, the inner surface of said ring having one portion formed according to the eccentricity of the shoulder on said pivot member, and the remaining portion of said surface having the same curvature as the outer surface of said flange, and cooperating radial shoulders on said pivoted member and said ring.

Signed at Chicago this 31st day of October, 1928.

FREDERICK C. KAINER.